United States Patent
Kawahara et al.

(10) Patent No.: US 7,565,954 B2
(45) Date of Patent: Jul. 28, 2009

(54) BRAKE CONTROL APPARATUS FOR VEHICLE

(75) Inventors: Yoshinari Kawahara, Chiyoda-ku (JP);
Tadahiko Nogami, Chiyoda-ku (JP);
Takaomi Nishigaito, Chiyoda-ku (JP);
Atsushi Yokoyama, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 35 days.

(21) Appl. No.: 11/639,324

(22) Filed: Dec. 15, 2006

(65) Prior Publication Data
US 2007/0138861 A1      Jun. 21, 2007

(30) Foreign Application Priority Data
Dec. 15, 2005    (JP) ............................... 2005-361916

(51) Int. Cl.
*F16D 55/08* (2006.01)
(52) U.S. Cl. .................................. 188/1.11 L; 188/158
(58) Field of Classification Search ............. 188/1.11 E,
188/1.11 L, 158–162; 303/140, 146, 155,
303/186
See application file for complete search history.

(56) References Cited

U.S. PATENT DOCUMENTS

| | | | |
|---|---|---|---|
| 5,539,641 A * | 7/1996 | Littlejohn ..................... 701/70 |
| 5,646,849 A * | 7/1997 | Walenty et al. ................ 701/70 |
| 6,158,822 A * | 12/2000 | Shirai et al. .................... 303/3 |
| 6,178,369 B1 * | 1/2001 | Bohm .......................... 701/70 |
| 6,217,131 B1 * | 4/2001 | Schanzenbach ............. 303/112 |
| 6,250,436 B1 * | 6/2001 | Oikawa et al. ............. 188/72.1 |
| 6,425,643 B2 * | 7/2002 | Shirai et al. ................. 303/112 |
| 6,435,625 B1 * | 8/2002 | Schwarz et al. ............... 303/20 |
| 6,471,015 B1 * | 10/2002 | Ralea et al. ............. 188/1.11 L |
| 6,662,906 B1 * | 12/2003 | Bohm et al. ............ 188/1.11 E |
| 6,929,333 B2 * | 8/2005 | DeVlieg ...................... 303/20 |
| 7,104,364 B2 * | 9/2006 | Godlewsky et al. ..... 188/1.11 L |
| 2002/0109403 A1 * | 8/2002 | Yamamoto et al. .......... 303/146 |
| 2007/0126281 A1 * | 6/2007 | Zumberge ..................... 303/3 |

FOREIGN PATENT DOCUMENTS

| JP | 2002-81475 A | 3/2002 |
|---|---|---|
| JP | 2003-175816 A | 6/2003 |

* cited by examiner

*Primary Examiner*—Christopher P Schwartz
(74) *Attorney, Agent, or Firm*—Crowell & Moring LLP

(57) ABSTRACT

A brake control apparatus for a vehicle having brake devices for generating pad-pressing forces at respective wheels includes brake control units for individually controlling the pad-pressing forces at the respective wheels; a storing unit for storing drive data required for controlling the pad-pressing force at each wheel; a vehicle-driving-state detector for detecting a driving state of the vehicle; and a vehicle controller for controlling a vehicle driving state using the brake control unit for each wheel. Memory data representing the relationship between a motor position and the pad-pressing force is updated using the state of brake actuators obtained when the driving state of the vehicle is stabilized by operating the brake devices during braking.

8 Claims, 11 Drawing Sheets

BRAKE CONTROL APPARATUS FOR VEHICLE

BACKGROUND OF THE INVENTION

1. Field of the Invention

The present invention relates to a control apparatus for a brake device which can control a displacement of a piston using an electromotive device, such as a motor, and which generates a braking force by moving the piston so as to bring a brake friction member into contact with an object to be braked.

2. Description of the Related Art

Recently, various brake devices that can freely change a pressing force applied to a brake friction member using an electromotive device, such as a motor, have been suggested. A vehicle having such a brake device can perform brake control without being restricted by a brake command from a driver. Therefore, it is possible to improve both the safety in driving the vehicle and comfort. For example, Japanese Unexamined Patent Application Publication No. 2003-175816 discloses an electric brake system capable of synchronizing the times at which brake devices apply brakes to respective wheels. In this system, when it is detected that a brake pad of one of the brake devices has come into contact with a corresponding disc rotor, a braking force obtained at the contact position is maintained while brake pads of other brake devices that are not yet in contact with respective disc rotors are quickly brought into contact with the respective disc rotors.

In general, such a brake device includes an electric actuator and is controlled by a control device that stores a graph representing the relationship between a motor position and a pressing force applied to the pad in advance. The motor is controlled such that the motor position corresponds to a pressing force required by the driver.

On the other hand, Japanese Unexamined Patent Application Publication No. 2002-81475 discloses a method for detecting a motor position corresponding to a contact point at which a pad comes into contact with a disc but receives no pressing force. The motor position corresponding to the contact point is detected using information of the motor current and the motor position. If a piston displacement corresponding to the contact point at which the pad comes into contact with the disc can be accurately detected, the pressing force applied the pad can be more accurately estimated from the displacement of the motor.

The brake devices described in Japanese Unexamined Patent Application Publication Nos. 2003-175816 and 2002-81475 are mounted on vehicle wheels and used in severe environments. Therefore, signals output from sensors used to control the actuators include noise. As a result, if the relationship between the motor current and the motor position is used to construct a graph showing the relationship between the motor position and the pad-pressing force as described in Japanese Unexamined Patent Application Publication No. 2002-81475, the graph differs for each brake device. In addition, the graph varies due to aging of the actuator and ambient temperature variations. Therefore, there is a possibility that the pad-pressing force recognized by the control device will largely differ from the actual pad-pressing force.

In such a case, the left and right wheels receive different braking forces and there is a risk that the driving direction of the vehicle will be changed due to braking, which is extremely dangerous. Therefore, the relationship between the motor position and the pad-pressing force should be adequately compensated, properly corrected to ensure safe braking.

SUMMARY OF THE INVENTION

In light of the above, an object of the present invention is to provide a brake control apparatus that does not cause a large difference in braking force between left and right vehicle wheels due to differences in graphs which each show the relationship between a motor position and a pad-pressing force and due to variations in each graph caused by aging and ambient temperature variations.

In order to achieve the above-described object, according one aspect of the present invention, a brake control apparatus for a vehicle having brake units for applying braking forces to wheels using respective brake friction members includes brake control units for individually controlling displacements of the brake friction members; a storing unit for storing drive data required for controlling the displacements; a vehicle-driving-state detector for detecting a physical value that indicates a driving state of the vehicle; and a vehicle controller for controlling the driving state of the vehicle using the brake control unit for each wheel on the basis of the detected physical value. The vehicle controller acquires control data as a result of controlling the driving state of the vehicle with the brake units, corrects the drive data stored in the storing unit using the acquired control data, and updates the drive data stored in the storing unit.

According another aspect of the present invention, a brake control apparatus for a vehicle having brake units for applying braking forces to wheels using respective brake friction members includes brake control units for individually controlling displacements of the brake friction members; a storing unit for storing drive data required for controlling the displacements; a vehicle-driving-state detector for detecting a physical value that indicates a driving state of the vehicle; and a vehicle controller for controlling the driving state of the vehicle using the brake control unit for each wheel on the basis of the detected physical value. The vehicle controller acquires control data as a result of causing the brake unit to perform a predetermined operation while the vehicle is stationary, corrects the drive data stored in the storing unit using the acquired control data, and updates the drive data stored in the storing unit.

In the brake control apparatus, the vehicle controller may acquire the control data on the basis of a pressing force applied to each wheel after vehicle-stabilizing control, the vehicle-stabilizing control being performed when a yaw angular velocity is equal to or more than a predetermined value during brake control performed in response to a brake command.

In addition, in the brake control apparatus, the vehicle controller may receive a correction command signal for correcting the drive data, perform a pressing-force increasing/decreasing operation of increasing and decreasing a pressing force applied to each wheel after confirming that the vehicle is stationary, and then acquire the control data based on a motor current obtained as a result of the pressing-force increasing/decreasing operation.

According to the present invention, the brake control apparatus estimates a pressing force by referring to a rigidity graph that is stored in advance and that shows the relationship between the motor position and the pad-pressing force. The rigidity graph can be compensated, corrected using the state of brake actuators obtained when the driving state of the vehicle is stabilized by operating brake devices during braking. Accordingly, it is possible to apply the same pressing force to the left and right wheels irrespective of the variation in the current sensor value used for constructing the rigidity graph and the variation in the rigidity of each actuator due to aging thereof. As a result, the stability of the driving state of the vehicle during braking can be increased and the safety in driving the vehicle can be improved.

When the process according to the present invention is performed at the timing of vehicle inspections, the rigidity graph can be reliably corrected at regular intervals. Accordingly, the safety in driving the vehicle can be prevented from being endangered due to aging of the brake devices.

DESCRIPTION OF THE PREFERRED EMBODIMENTS

Figure 1:
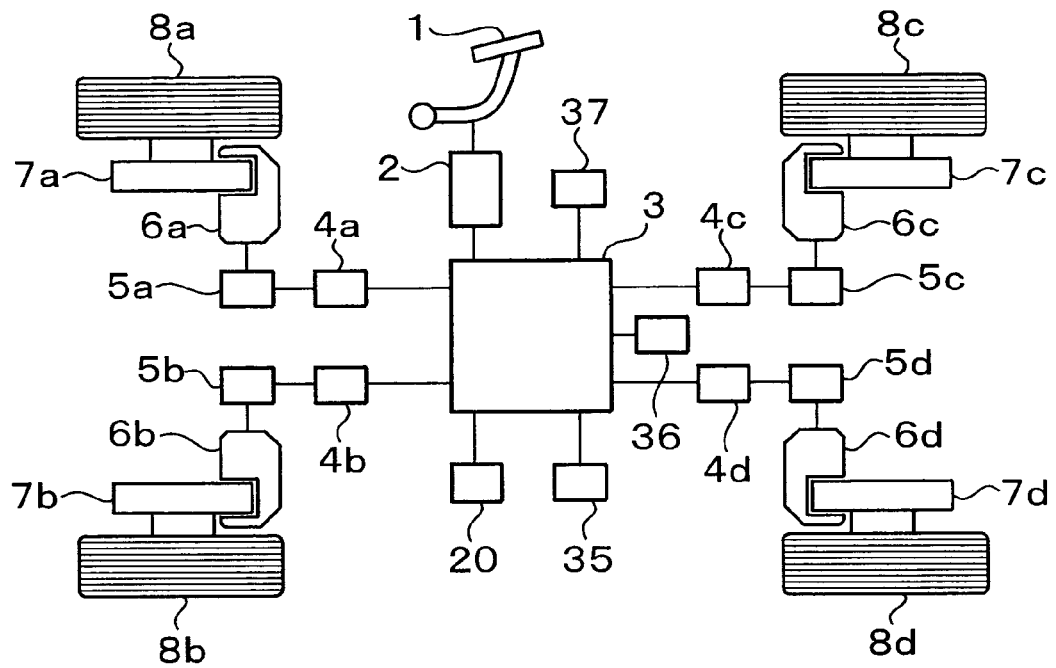
FIG. 1 is a diagram illustrating the overall system structure of a four-wheeled vehicle including a brake control apparatus according to an embodiment of the present invention.

A brake control apparatus according to an embodiment of the present invention will be described in detail below with reference to FIGS. 1 to 14. FIG. 1 is a diagram illustrating the overall system structure of a vehicle including the brake control apparatus according to the embodiment of the present invention. More specifically, FIG. 1 shows a brake control system of the vehicle (for example, an automobile) having four wheels which each receive a braking force. Electric brake devices that function as brake devices for individually controlling the braking forces applied to the respective wheels are mounted on the vehicle.

Referring to FIG. 1, the vehicle includes wheels 8a to 8d; disc rotors 7a to 7d that rotate together with the respective wheels 8a to 8d; electric brake actuators 6a to 6d that slide along the respective disc rotors 7a to 7d while being pressed thereagainst; a brake pedal 1; a stroke sensor 2 that converts a displacement of the brake pedal 1 into an electric signal; a main controller 3 that performs overall control of the braking forces applied to the respective wheels on the basis of the electric signal from the stroke sensor 2; electric brake controllers 4a to 4d that control the electric brake devices for the respective wheels on the basis of electric signals output from the main controller 3; motor drivers 5a to 5d that input currents to motors included in the respective electric brake actuators 6a to 6d to drive the motors on the basis of electric signals output from the respective electric brake controllers 4a to 4d; a yaw angular velocity sensor 20 for measuring a yaw angular velocity of the vehicle body; a switch 35 for starting the operations of the brake actuators 6a to 6d; an odometer 36 for measuring a travel distance of the vehicle; and a warning lamp 37 for issuing a warning to the user.

Figure 2:
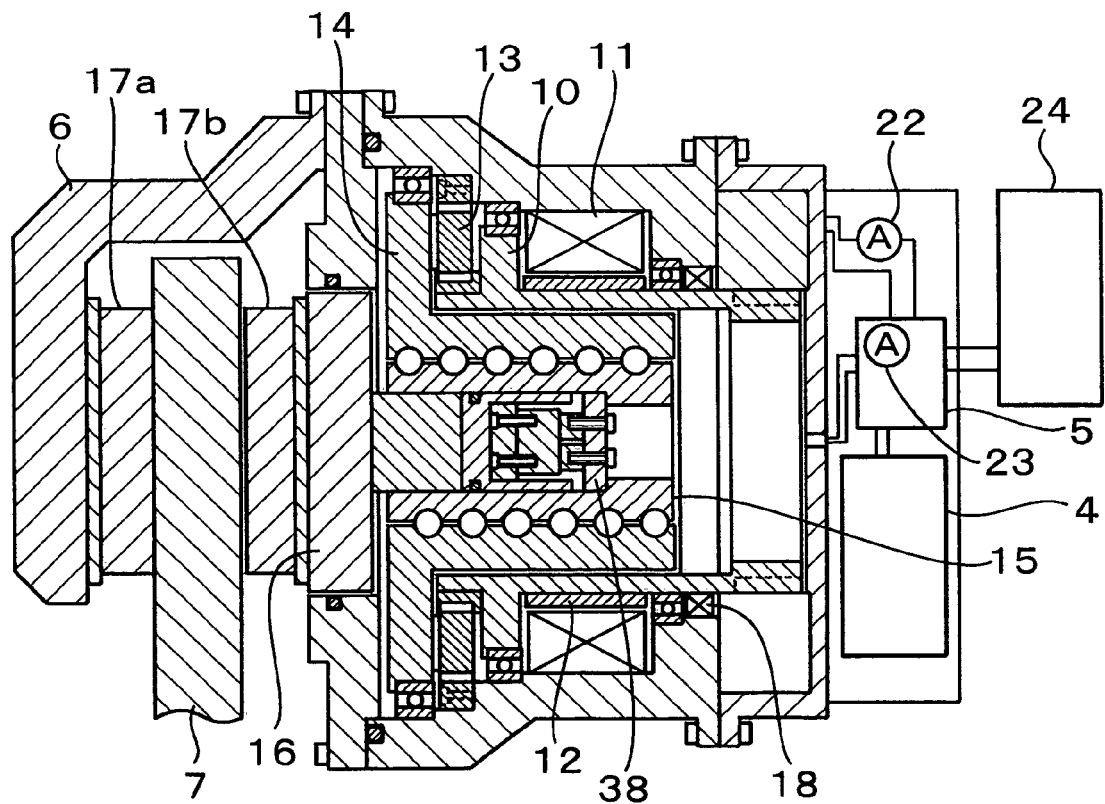
FIG. 2 is a diagram illustrating the structure of an electric brake actuator connected to the brake control apparatus according to the embodiment of the present invention.

FIG. 2 is a diagram illustrating the structure of each of the electric brake actuators connected to the brake control apparatus according to the embodiment of the present invention. The structure and the operational mechanism of each electric brake actuator 6 according to the present embodiment will be described below with reference to FIG. 2.

The electric brake actuator 6 includes a motor coil 11 that receives a current from the motor driver 5; a motor rotor 10 that rotates when the magnetic field of the motor coil 11 varies; a magnet 12 fixed to the motor rotor 10; a speed reducer 13 that reduces the rotational speed of the motor rotor 10 and increases a torque thereof; a ball screw 14 that functions as a mechanism for converting rotation into linear movement after the rotational speed is reduced by the speed reducer 13; a piston 16 that is linearly moved by a ball screw rod 15; brake pads 17a and 17b that are fixed to the piston 16 and are capable of being pressed against the disc rotor 7; a resolver 18 for detecting a rotational displacement of the motor rotor 10; a motor current sensor 23 for measuring the current that flows through the motor coil 11; the motor driver 5; the electric brake controller 4; a battery 24 for applying a voltage to the motor driver 5 and the electric brake controller 4; and a pressing-force sensor 38 for measuring the pressing force applied to the brake pads 17a and 17b. In place of the ball screw 14 that functions as the mechanism for converting rotation to linear movement, other structures, such as a ball ramp, may also be used. The pressing-force sensor 38 may be omitted in the electric brake actuators 6c and 6d for the rear wheels.

A motor that functions as a drive source of the above-described electric brake device is a brushless motor including the motor coil 11, the motor rotor 10, the magnet 12 fixed to the motor rotor 10, and a bearing that is also fixed to the motor rotor 10. The brushless motor is controlled using a measurement value obtained by the resolver 18 for detecting the rotational displacement of the motor rotor 10 and a measurement value obtained by the motor current sensor 23 for measuring the current that flows through the motor coil 11.

When the motor rotor 10 generates a torque, the speed reducer 13 rotates together with the motor rotor 10 to increase the generated torque. Accordingly, the ball screw 14 is operated so as to move the piston 16 linearly, thereby pressing the brake pads 17 against the disc rotor 7 or moving the brake pads 17 away from the disc rotor 7. When the brake pads 17 are pressed against the disc rotor 7, the brake pads 17 are deformed to generate a pressing force.

Figure 3:
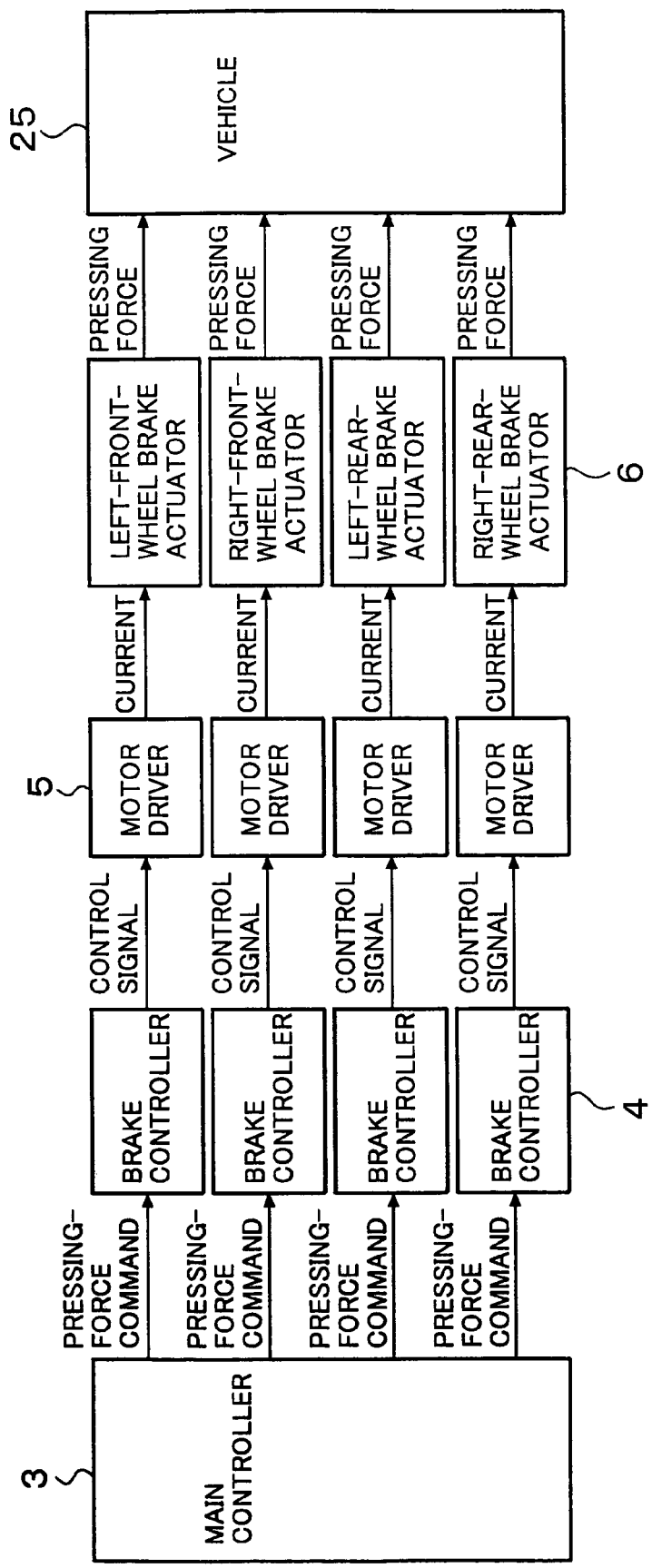
FIG. 3 is a block diagram illustrating the structure of control signals for controlling brake devices of the vehicle with the brake control apparatus according to the embodiment of the present invention.

FIG. 3 is a block diagram illustrating the structure of control signals for controlling the brake devices of the four-wheeled vehicle with the brake control apparatus according to the embodiment of the present invention. FIG. 3 shows major components included in the brake control system of the four-wheeled vehicle and the manner in which data are communicated between the components. The four wheels 8 are respectively provided with the electric brake actuators 6, and the electric brake actuators 6 are respectively controlled by the brake controllers 4 and the motor drivers 5. The brake controllers 4 receive pad-pressing-force commands from the main controller 3 and generate control signals for controlling the pad-pressing forces generated by the respective brake actuators 6. The motor drivers 5 receive the control signals from the respective brake controllers 4 and generate currents to be applied to the motor coils included in the respective brake actuators 6. The brake actuators 6 receive the currents and generate the pad-pressing forces, thereby controlling the vehicle motion. The main controller 3 receives a wheel speed (not shown), the yaw angular velocity (reference numeral 20 in FIG. 1), etc., which represent the state of the vehicle motion, and generates the pressing-force commands on the basis of the received information.

Figure 4:
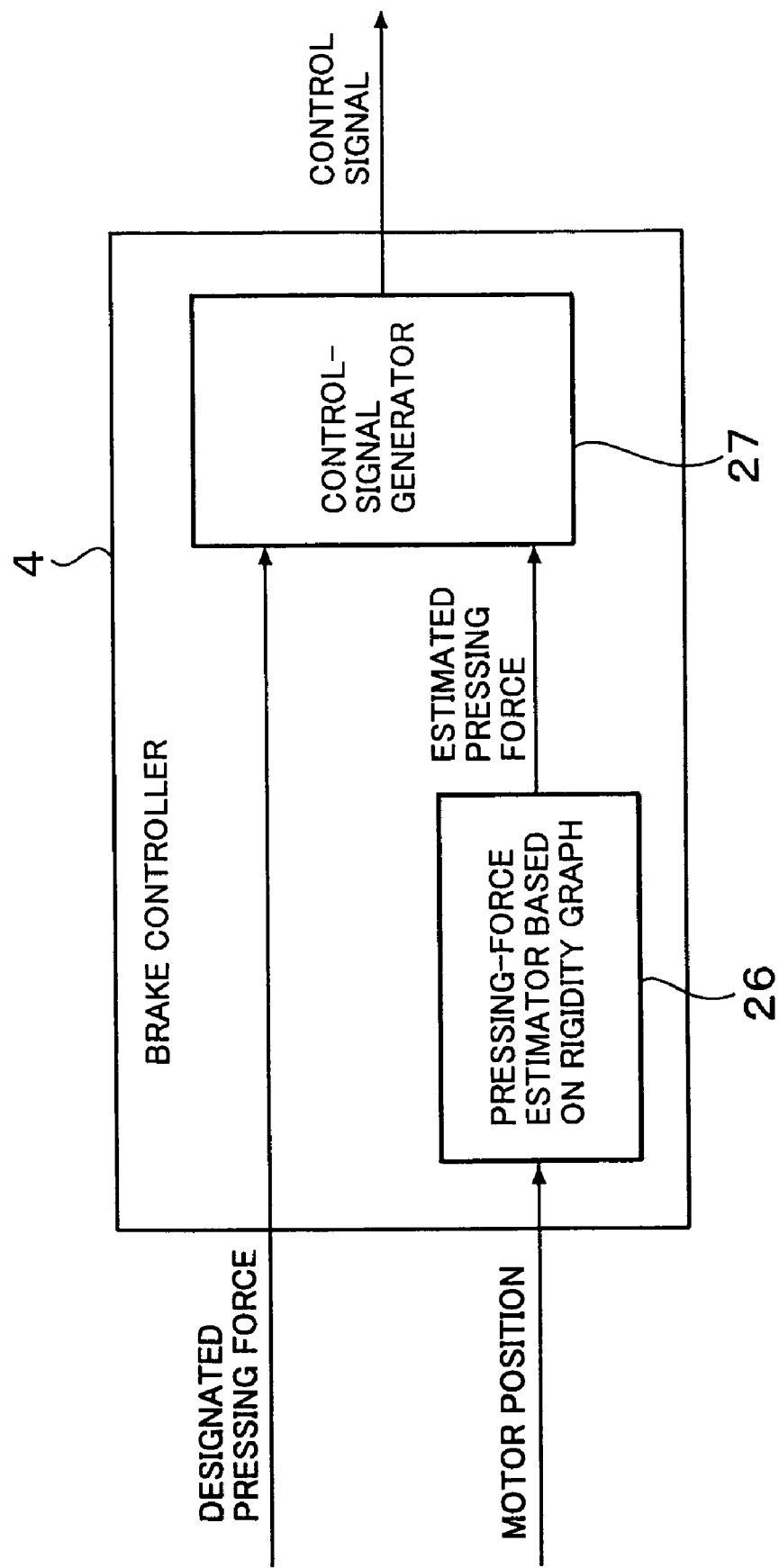
FIG. 4 is a diagram illustrating the inner structure and the signal structure of each brake controller included in the brake control apparatus according to the embodiment of the present invention.

FIG. 4 is a diagram illustrating the inner structure and the signal structure of each brake controller included in the brake control apparatus according to the embodiment of the present invention. Referring to FIG. 4, the brake controller 4 includes a pressing-force estimator 26 that estimates the pressing force from a motor position on the basis of the relationship between the motor position and the pressing force, and a control-signal generator 27. The pressing-force estimator 26 has an internal or external memory for storing data. The memory stores graph data showing pressing forces corresponding to motor positions at predetermined intervals. The graph of pressing force versus motor position is called a rigidity graph. The pressing-force estimator 26 acquires the motor position (the rotational displacement of the rotor) from the resolver 18 mounted in the corresponding brake actuator 6, interpolates the graph data stored in the memory by checking the motor positions set in the rigidity graph, and outputs an estimated pressing force. The control-signal generator 27 receives the estimated pressing force that is determined on the basis of the rigidity graph and output from the pressing-force estimator 26 and a designated pressing force that is output from the main controller 3. Then, the control-signal generator 27 converts the difference between the estimated pressing force and the designated pressing force into a control signal to perform PID control.

Figure 5:
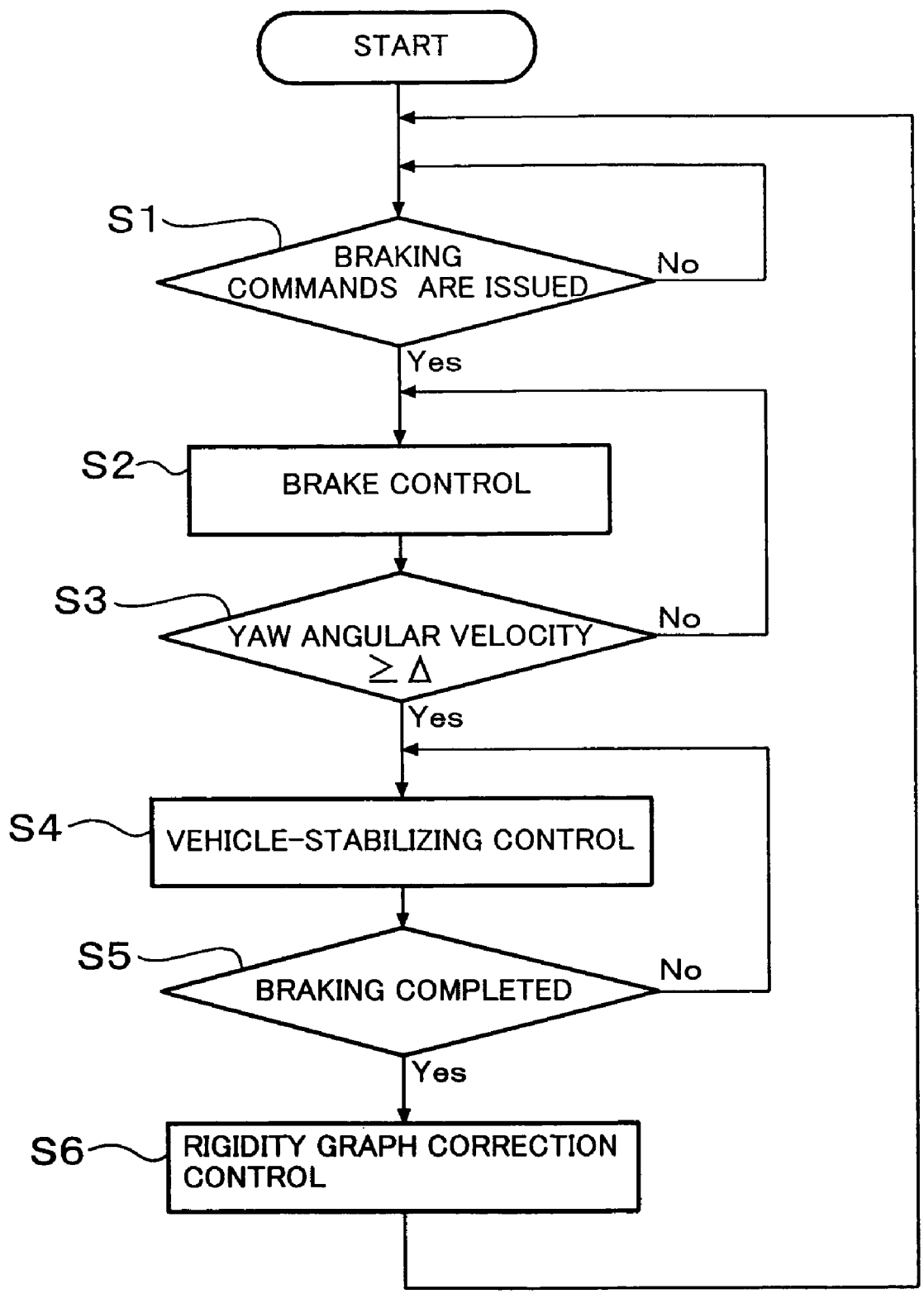
FIG. 5 is a flowchart showing the basic operational sequence performed by the brake control apparatus according to the embodiment of the present invention.

Next, the operation of the brake control apparatus according to the embodiment of the present invention will be described below with reference to FIGS. 5 to 14. FIG. 5 is a flowchart showing the basic operational sequence performed by the brake control apparatus according to the embodiment of the present invention.

Referring to FIG. 5, first, the system shown in FIG. 3 is started in the vehicle having the structure shown in FIG. 1. Then, in Step 1, it is determined whether or not brake commands are issued by the main controller 3, that is, whether or not the brake pedal 1 is operated. The presence/absence of the brake commands is determined by checking whether or not the designated pressing forces output by the main controller 3 are zero. If it is determined that the brake commands are not issued, the determination of whether or not the brake commands are issued is repeated in Step 1. If it is determined that the brake commands are issued, the brake controllers perform the brake control in accordance with the pressing-force commands in Step 2.

Next, in Step 3, it is determined whether or not the absolute value of a yaw angular velocity of the vehicle body that is detected by the yaw angular velocity sensor 20 is equal to or more than a predetermined value Δ. If it is determined that the absolute value of the yaw angular velocity is less than the predetermined value Δ, it is determined that the driving state of the vehicle is stable and the brake control is continued in Step 2. If the absolute value of the yaw angular velocity is equal to or more than the predetermined value Δ, that is, if the rate at which the vehicle yaws is equal to or more than the predetermined value, it is determined that the driving state of the vehicle is unstable. Therefore, vehicle-stabilizing control is performed in Step 4. An example of the vehicle stabilizing control will be described below with reference to FIG. 6. Then, it is determined whether or not braking is completed, that is, whether or not the brake pedal is released or the vehicle is stopped, in Step 5. If braking is not completed, the vehicle-stabilizing control is continued in Step 4. In other words, the vehicle-stabilizing control is continued until braking is completed. If braking is completed, correction control for correcting the rigidity graph data is performed in Step 6. The concept of the correction control will be described below with reference to FIGS. 8 and 9, and the conditions and sequence of the correction control will be described below with reference to FIG. 10.

Figure 6:
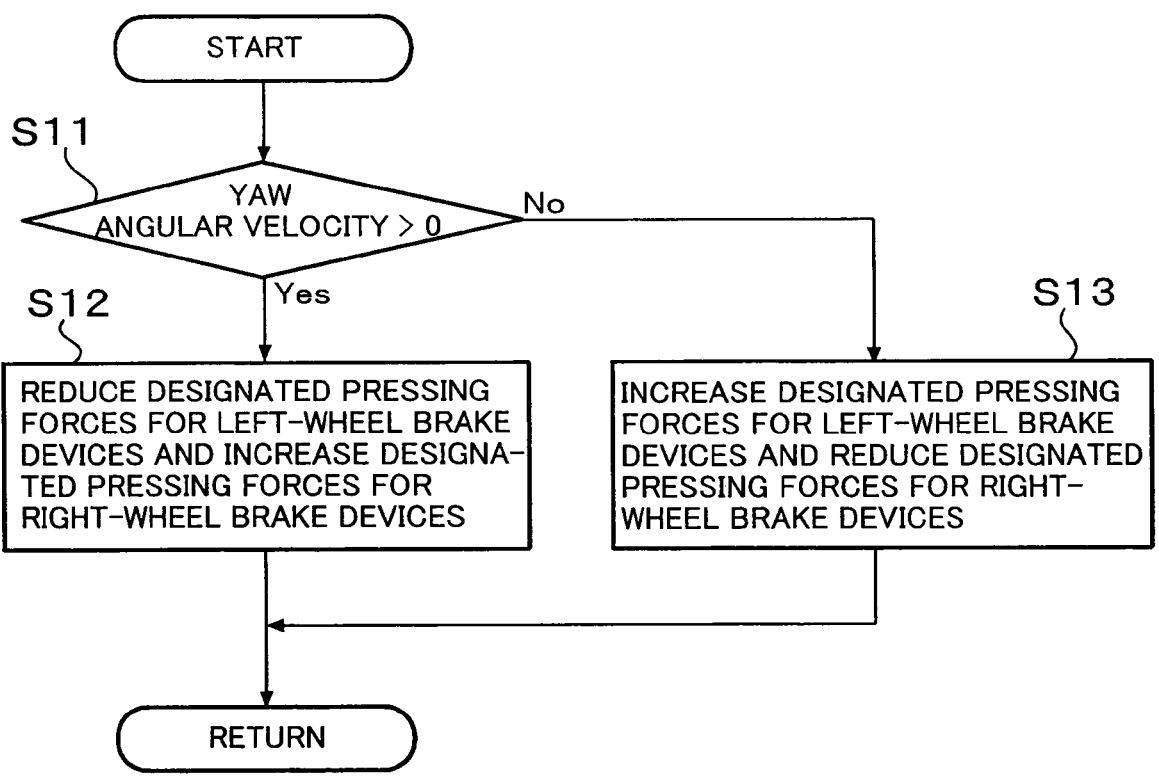
FIG. 6 is a flowchart showing an example of vehicle-stabilizing control performed by the brake control apparatus according to the embodiment.

FIG. 6 is a flowchart showing an example of the vehicle-stabilizing control performed by the brake control apparatus according to the present embodiment. In the vehicle-stabilizing control, first, it is determined whether the initial yaw angular velocity of the vehicle is positive or negative in Step 11. Here, the yaw angular velocity in the counterclockwise direction when the vehicle is viewed from above is defined as positive, and the yaw angular velocity in the clockwise direction is defined as negative. If it is determined that the yaw angular velocity is positive in Step 11, the designated pressing forces for the left-wheel brake devices are reduced while the designated pressing forces for the right-wheel brake devices are increased in Step 12. If it is determined that the yaw angular velocity is negative in Step 11, the designated pressing forces for the left-wheel brake devices are increased while the designated pressing forces for the right-wheel brake devices are reduced in Step 13. Thus, brakes are applied so as to reduce or eliminate the yawing of the vehicle. In the present embodiment, the designated pressing forces are changed by the same amount for all of the brake devices, and the amount of change is calculated by multiplying the absolute value of the yaw angular velocity by a gain.

Figure 7A:
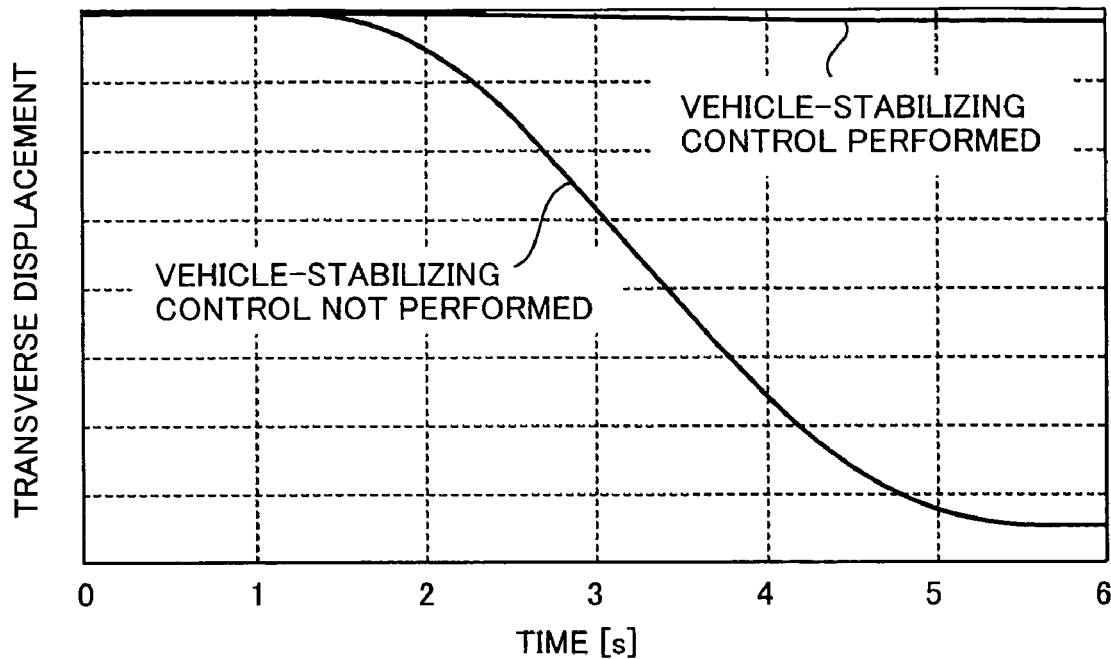
FIG. 7A is a graph showing the effect of the vehicle-stabilizing control performed by the brake control apparatus according to the embodiment.
Figure 7B:
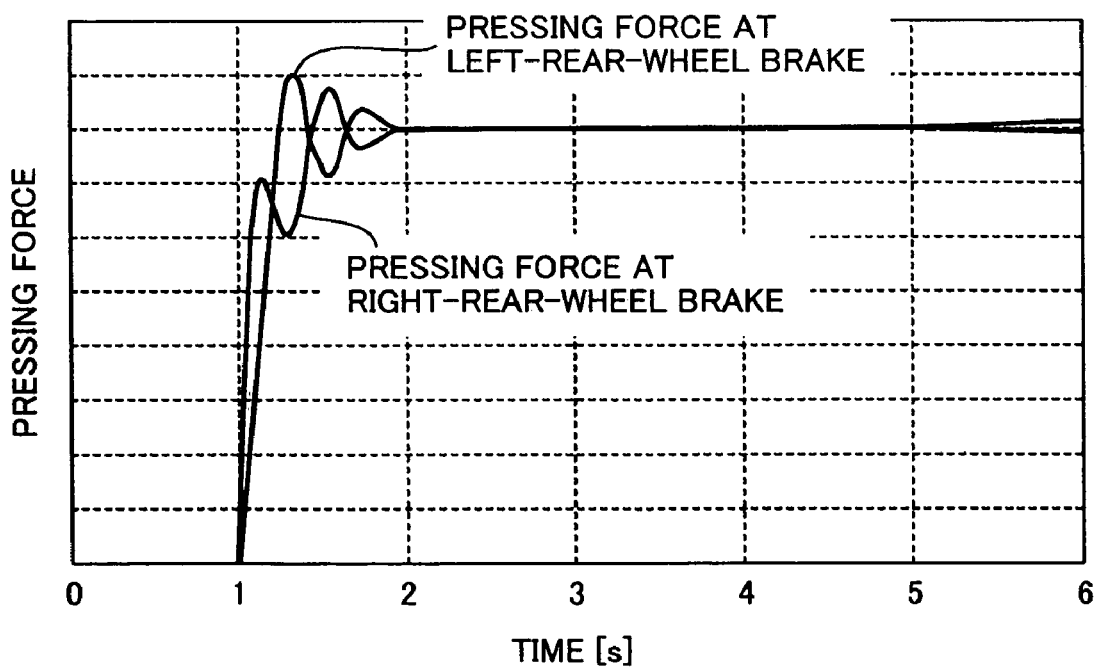
FIG. 7B is a graph showing pad-pressing forces generated during the vehicle-stabilizing control performed by the brake control apparatus according to the embodiment.

FIG. 7A is a graph showing the effect of the vehicle-stabilizing control performed by the brake control apparatus according to the present embodiment, and FIG. 7B is a graph showing the pad-pressing forces generated during the vehicle-stabilizing control. FIG. 7A shows the transverse displacement of the vehicle from the initial position thereof when braking is started by initially giving different designated pressing forces to the left-rear-wheel brake controller and the right-rear-wheel brake controller while the vehicle is running. In FIG. 7A, the result obtained when the vehicle-stabilizing control is performed is shown together with the result obtained when the vehicle-stabilizing control is not performed. The transverse displacement that occurs when the vehicle-stabilizing control is performed is smaller than the transverse displacement that occurs when the vehicle-stabilizing control is not performed.

FIG. 7B shows the time series graph of the pressing forces generated by the left-rear-wheel brake device and the right-rear-wheel brake device when the vehicle-stabilizing control is performed. As shown in FIG. 7B, the pressing forces generated by the left-rear-wheel brake device and the right-rear-wheel brake device become approximately equal to each other after the vehicle-stabilizing control. According to the embodiment of the present invention, the rigidity graph data stored in the memory of each brake controller is corrected by utilizing the fact that the pressing forces generated by the brake devices on the left and right wheels become approximately equal to each other after the vehicle-stabilizing control (after 2 seconds in the example shown in FIG. 7B). Therefore, after the correction, the yaw angular velocity can be prevented from becoming equal to or more than the predetermined value $\Delta$ (see FIG. 5) during braking.

Figure 8:
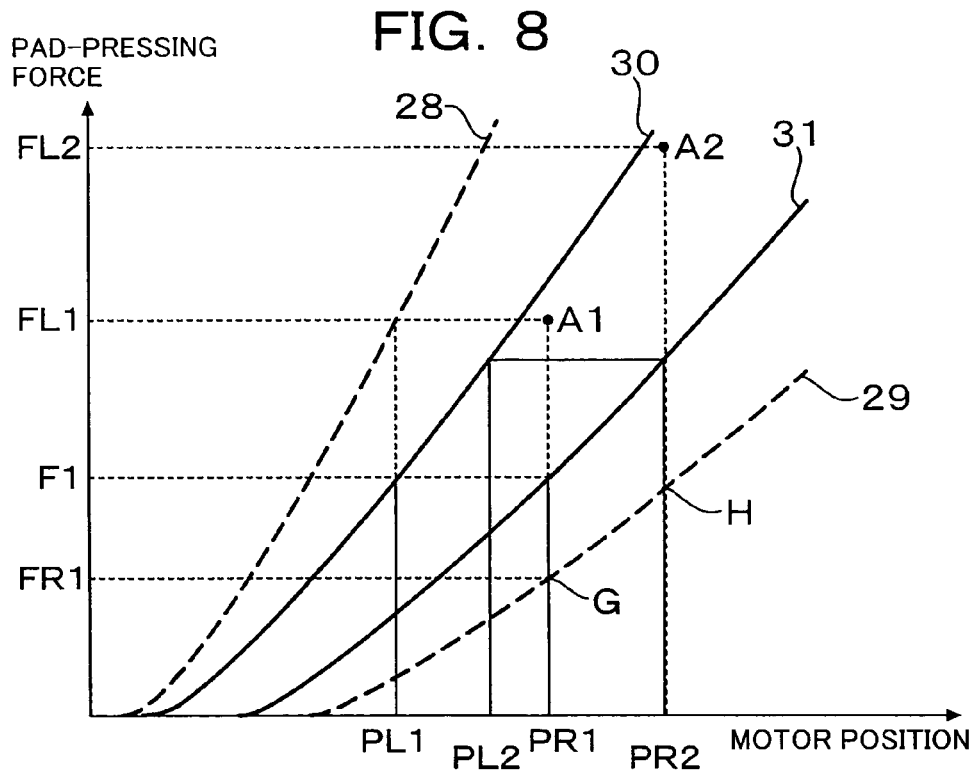
FIG. 8 is a diagram illustrating correction points required for correcting a rigidity graph representing the relationship between the motor position and the pad-pressing force according to the embodiment.
Figure 9:
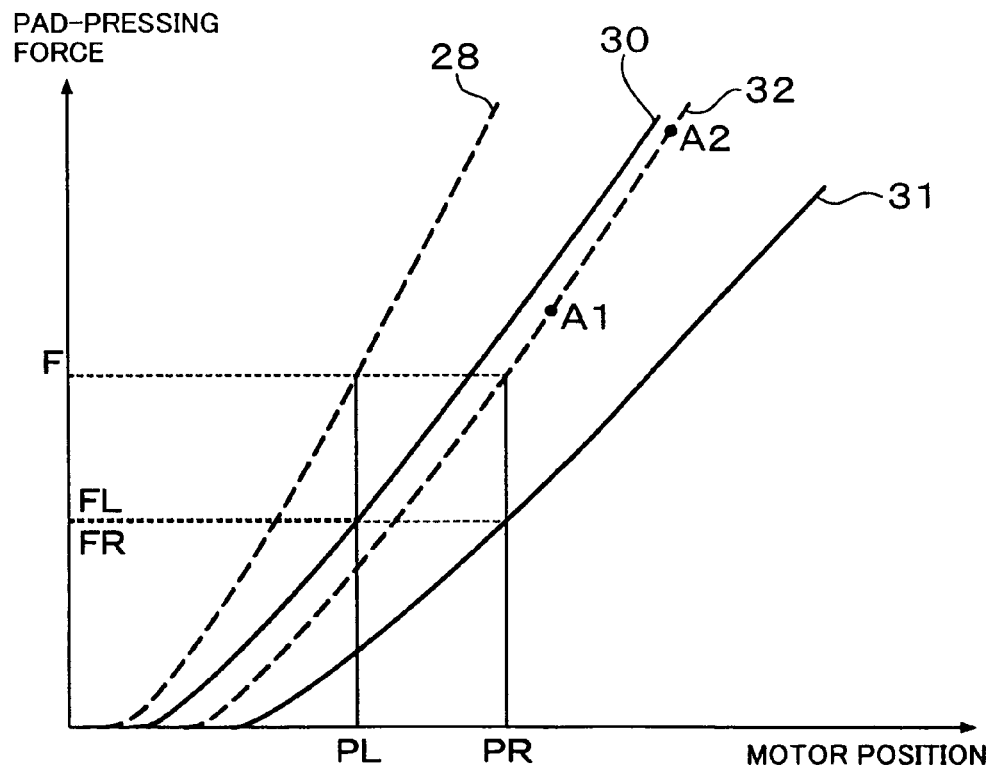
FIG. 9 is a diagram illustrating the effect obtained by correcting the rigidity graph representing the relationship between the motor position and the pad-pressing force according to the embodiment.

FIG. 8 is a diagram illustrating correction points required for correcting a rigidity graph representing the relationship between the motor position and the pad-pressing force according to the present embodiment. FIG. 9 is a diagram illustrating the effect obtained by correcting the rigidity graph representing the relationship between the motor position and the pad-pressing force according to the present embodiment. An example of a method for correcting the rigidity graph data will be described below with reference to FIGS. 8 and 9. Although the case in which the method is applied to the left-rear-wheel brake device and the right-rear-wheel brake device will be explained as an example, the method may also be applied to all of the four wheels in four-wheeled vehicles.

FIG. 8 shows rigidity graphs which each show the relationship between the motor position and the pressing force in the corresponding brake actuator. In FIG. 8, a curve 28 shows a current rigidity graph of the left-rear-wheel brake actuator, which is stored in the memory of the corresponding brake controller. The current rigidity graph may either be an initial rigidity graph or a graph obtained by correcting the initial rigidity graph. Similarly, a curve 29 shows a current rigidity graph of the right-rear-wheel brake actuator, which is stored in the memory. A curve 30 shows the actual rigidity graph at the left rear wheel, that is, a graph representing the actual relationship between the motor position and the pad-pressing force instead of the graph stored in the memory of the corresponding brake controller. Similarly, a curve 31 shows the actual rigidity graph at the right rear wheel. When, for example, the motor position of the left-rear-wheel brake actuator is PL1 and the motor position of the right-rear-wheel brake actuator is PR1 after the vehicle-stabilizing control, the left and right actuators output the same pressing force (the actual pressing force) F1. At this time, the pressing force of the left-rear-wheel brake actuator determined by the left-rear-wheel brake controller on the basis of the rigidity graph stored in the memory is FL1 (see the curve 28 in FIG. 8). Similarly, the pressing force of the right-rear-wheel brake actuator determined by the right-rear-wheel brake controller is FR1 (see the curve 29 in FIG. 8).

After the vehicle-stabilizing control, the point A1 where the motor position at the right wheel is PR1 and the pressing force is FL1 is determined. Here, the motor position PR1 can be obtained by the resolver 18 shown in FIG. 2 and the pressing force FL1 can be obtained by the pressing-force sensor 38 shown in FIG. 2. Then, the vehicle-stabilizing control is performed again at some other time and the point A2 where the motor position is PR2 and the pressing force is FL2 is determined in a similar manner.

Then, the curve 29, which shows the rigidity graph of the right-rear-wheel brake actuator stored in the memory of the right-rear-wheel brake controller, is corrected to a graph that passes through the points A1 and A2. Thus, the rigidity graph for the right rear wheel is corrected to show the characteristics of the rigidity graph for the left rear wheel, thereby preventing the yaw angular velocity from becoming equal to or more than the predetermined value $\Delta$ when the brake control is performed in response to the brake command the next time. To correct the rigidity graph, first, a graph is constructed by multiplying all of the pressing-force data elements forming the curve 29 by a coefficient c such that a linear line connecting two points G and H that correspond to the motor positions PR1 and PR2, respectively, on the curve 29 becomes parallel to a linear line connecting the points A1 and A2. Then, the thus-constructed graph is translated along the horizontal axis such that the graph passes through the points A1 and A2.

FIG. 9 shows the rigidity graph obtained by correcting the curve 29 shown in FIG. 8 to a curve 32. When the brake control is performed after the correction, the brake controllers 4 respectively control the motor positions to PL and PR to generate the pressing force F by the left and right brake actuators 6c and 6d. At this time, when the actual pressing forces generated by the left and right brake actuators are FL and FR, respectively, the absolute value of the difference between FL and FR is smaller than the absolute value of the difference between the actual pressing forces FL and FR before the correction (the pad-pressing forces corresponding to PL1 and PR1 in the curves 31 and 30, respectively, in FIG. 8). As a result, the difference between the braking forces applied to the left and right wheels can be reduced. Therefore, the driving state of the vehicle can be maintained stable during braking and the safety in driving the vehicle can be improved. In FIG. 9, F on the vertical axis shows the pressing force determined by the brake controllers and FL and FR show the actual pressing forces. In FIG. 8, the characteristics of the pad-pressing forces relative to the motor positions are shown as examples of rigidity graphs. However, data of characteristics showing the relationship between the displacement of the piston 16 and the pressing force generated between the disc rotor 7 and brake pads 17 may also be used. The brake control can be more accurately performed by detecting the piston position instead of the motor position.

Figure 10:
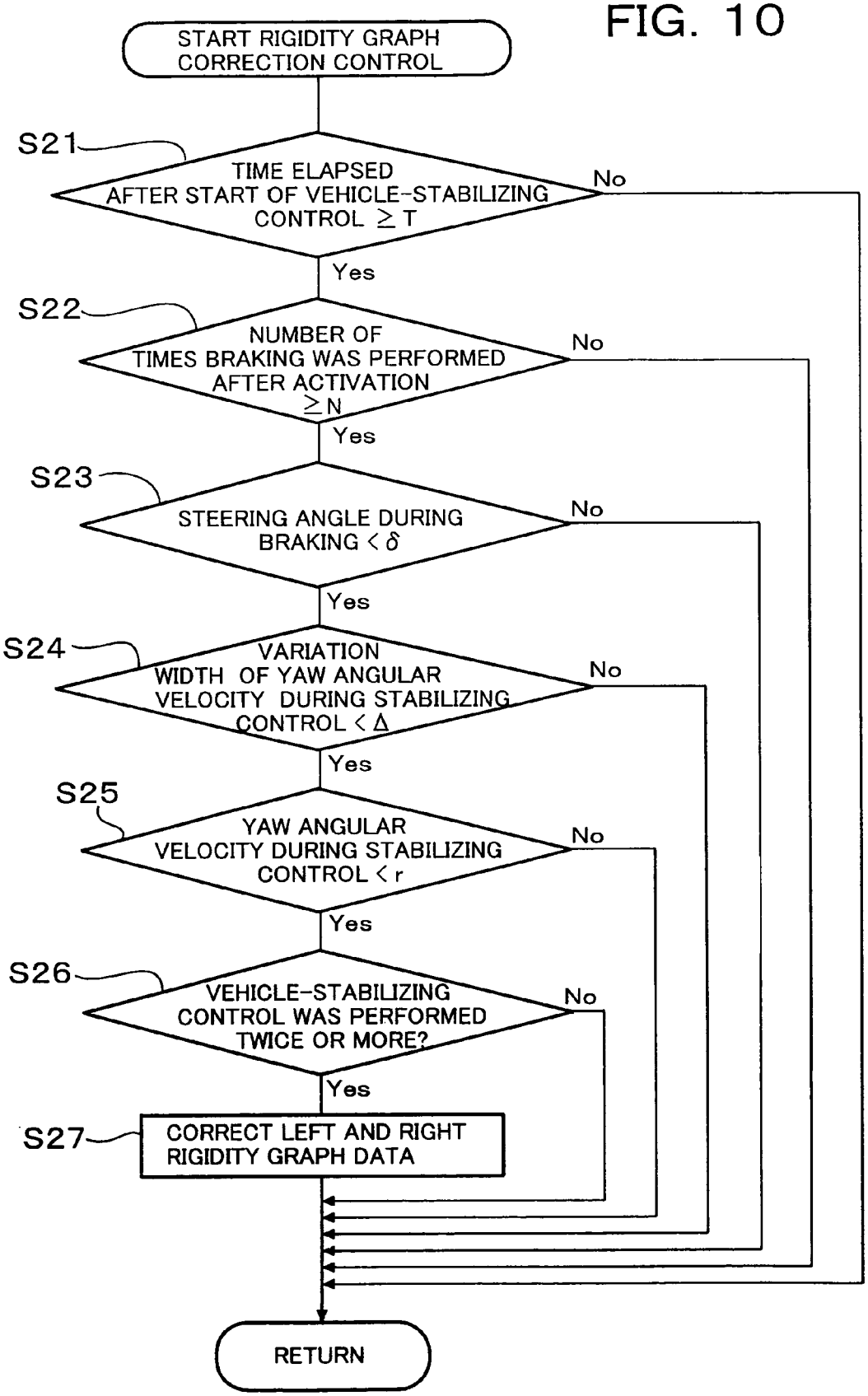
FIG. 10 is a flowchart showing an example of rigidity graph correction control performed by the brake control apparatus according to the embodiment.

FIG. 10 is a flowchart illustrating the details of the rigidity graph correction control performed in Step 6 shown in FIG. 5. When the rigidity graph correction control is started, first, it is determined whether or not the time elapsed after the start of the vehicle-stabilizing control is equal to or more than a predetermined time T in Step 21. Accordingly, the correction can be prevented from being performed while the pressing forces generated by the left and right brake actuators are not yet static. If it is determined that the time elapsed after the start of the vehicle-stabilizing control is equal to or more than T, it is determined whether or not the number of times braking was applied after activation is equal to or more than a predetermined number N in Step 22. Due to this determination, the correction control is prevented from being performed in a vehicle which has not been used for a long time and in which the frictional force between the disc rotor and the pads largely differs for each brake device due to oxidation of the disc rotor surface.

If it is determined that the number of times braking was applied after activation is equal to or more than the predetermined number N in Step 22, it is determined whether or not the steering angle was less than a predetermined angle $\delta$ during braking before the start of the rigidity graph correction control in Step 23. Due to this determination, the correction can be prevented from being performed using data obtained when the vehicle turns during braking. If it is determined that the steering angle was less than the predetermined angle δ during braking in Step 23, it is determined whether or not a variation width of the yaw angular velocity was less than a predetermined value Δ during the vehicle-stabilizing control in Step 24. Due to this determination, the correction is prevented from being performed when the coefficient of friction of the road differs between the left and right wheels or when locking of the wheels occurs during braking.

If it is determined that the variation width of the yaw angular velocity was less than the predetermined value Δ during the vehicle-stabilizing control in Step 24, it is determined whether or not the yaw angular velocity was always less than a predetermined value r during the vehicle-stabilizing control in Step 25. Due to this determination, the correction can be prevented from being performed when the vehicle-stabilizing control is not carried out normally. If it is determined that the vehicle-stabilizing control was carried out normally in Step 25, it is determined whether or not the number of times the vehicle-stabilizing control was carried out is two or more including the current time in Step 26. This determination is performed to correct the rigidity graph data using two points. If it is determined that the vehicle-stabilizing control was carried out two or more times, the correction of the rigidity graph data is performed in Step 27.

According to the present embodiment, the correction of the rigidity graph data is performed after the vehicle-stabilizing control is performed twice, that is, after the points A1 and A2 shown in FIGS. 8 and 9 are obtained. However, the rigidity graph may also be corrected so as to pass through a correction point obtained after the vehicle-stabilizing control is performed once. In such a case, the overall rigidity graph is rotated about the rising point thereof without moving the rising point, such that the graph passes through the correction point. In addition, if the vehicle-stabilizing control is performed three or more times, three or more points that correspond to the points A1 and A2 in FIG. 8 can be obtained. In such a case, a polynomial that passes through all of the points is set as the rigidity graph. Thus, a rigidity graph with high accuracy can be obtained.

In the example described with reference to FIGS. 8 and 9, the pressing force based on the rigidity graph of the left-rear-wheel actuator is larger than the pressing force based on the rigidity graph of the right-rear-wheel actuator, and the rigidity graph for the right rear wheel is corrected using the rigidity graph for the left rear wheel as a reference. However, the magnitude relationship between the pressing forces based on the initial rigidity graphs may also be opposite. In addition, the rigidity graph for the left rear wheel may be corrected using the rigidity graph for the right rear wheel as a reference.

Figure 11:
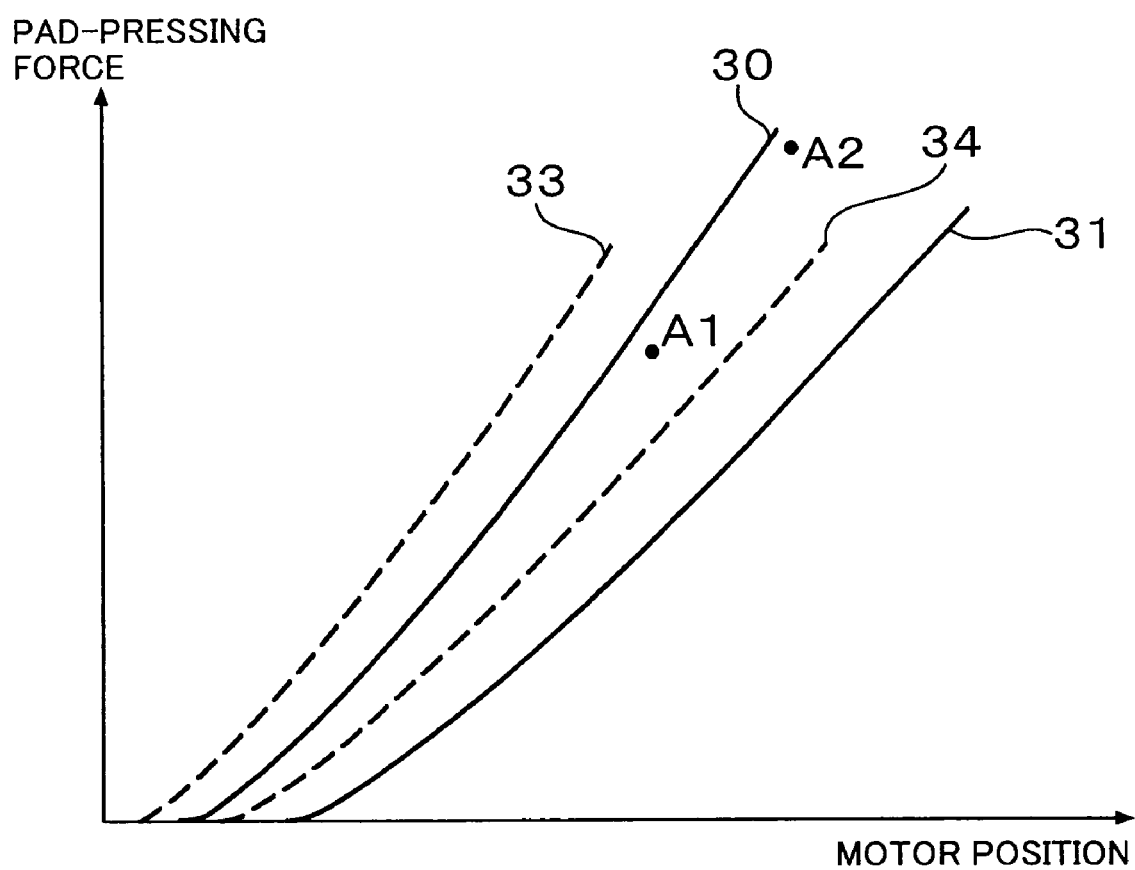
FIG. 11 is a diagram illustrating a method for setting estimated pressing forces in the rigidity graphs to be closer to the correct pressing forces.

FIG. 11 shows rigidity graphs obtained by processing the curves 28 and 32 shown in FIG. 9. Curves 33 and 34 shown in FIG. 11 are respectively obtained by multiplying pressing-force data elements forming the curves 28 and 32 shown in FIG. 9 by a coefficient e. The coefficient e satisfies $0<e<1$, and is determined such that the curve 34 obtained as a result of the multiplication by the coefficient e is drawn above the curve 29 shown in FIG. 8 for all of the motor positions. Due to this operation, the rigidity graphs stored in the memories are set to be closer to the correct rigidity graphs, that is, the actual rigidity graphs that are not stored in the memories. As a result, the control accuracy of the absolute values of the pressing forces can be improved. Instead of multiplying the pressing-force data elements forming the curves 28 and 32 by the coefficient, the graphs can be rotated about the respective rising points toward the initial curve 29 by the same amount. Also in this case, a similar effect can be obtained.

In the present embodiment, the vehicle-stabilizing control is performed using the yaw angular velocity. However, the wheel speed may also be used for the control. Alternatively, if the vehicle has a camera for a collision prevention system, the control may also be performed by determining whether of not the driving state of the vehicle is stable on the basis of the image obtained by the camera.

According to the above explanation, the rigidity graph data of the brake devices for the left and right rear wheels are corrected in a vehicle having four wheels and electric brake device for the respective wheels. However, the brake devices are not particularly limited as long as they can individually control the braking forces applied to the respective wheels. For example, electric brake devices using brake fluid pressures may also be used. In this type of electric brake device, the pad-pressing force is controlled by adjusting the pressure of brake fluid pressurized by a pump using an electric control valve. Brake systems using the liquid pressure generally have a dual circuit system having an X piping structure so as to ensure safety when a brake fluid pipe or a brake actuator fails. In a brake system having the X piping structure, when one of the circuits fails, the left-front-wheel brake device and the right-rear-wheel brake device, for example, are used. In such a case, the rigidity graph data correction according to the present invention is performed using one of the rigidity graph data for the left front wheel and that for the right rear wheel as a reference. The correction is performed such that the pressing-force ratio between the front-wheel and rear-wheel brake devices becomes equal to the braking-force ratio between the front-wheel and rear-wheel brake devices.

Figure 12:
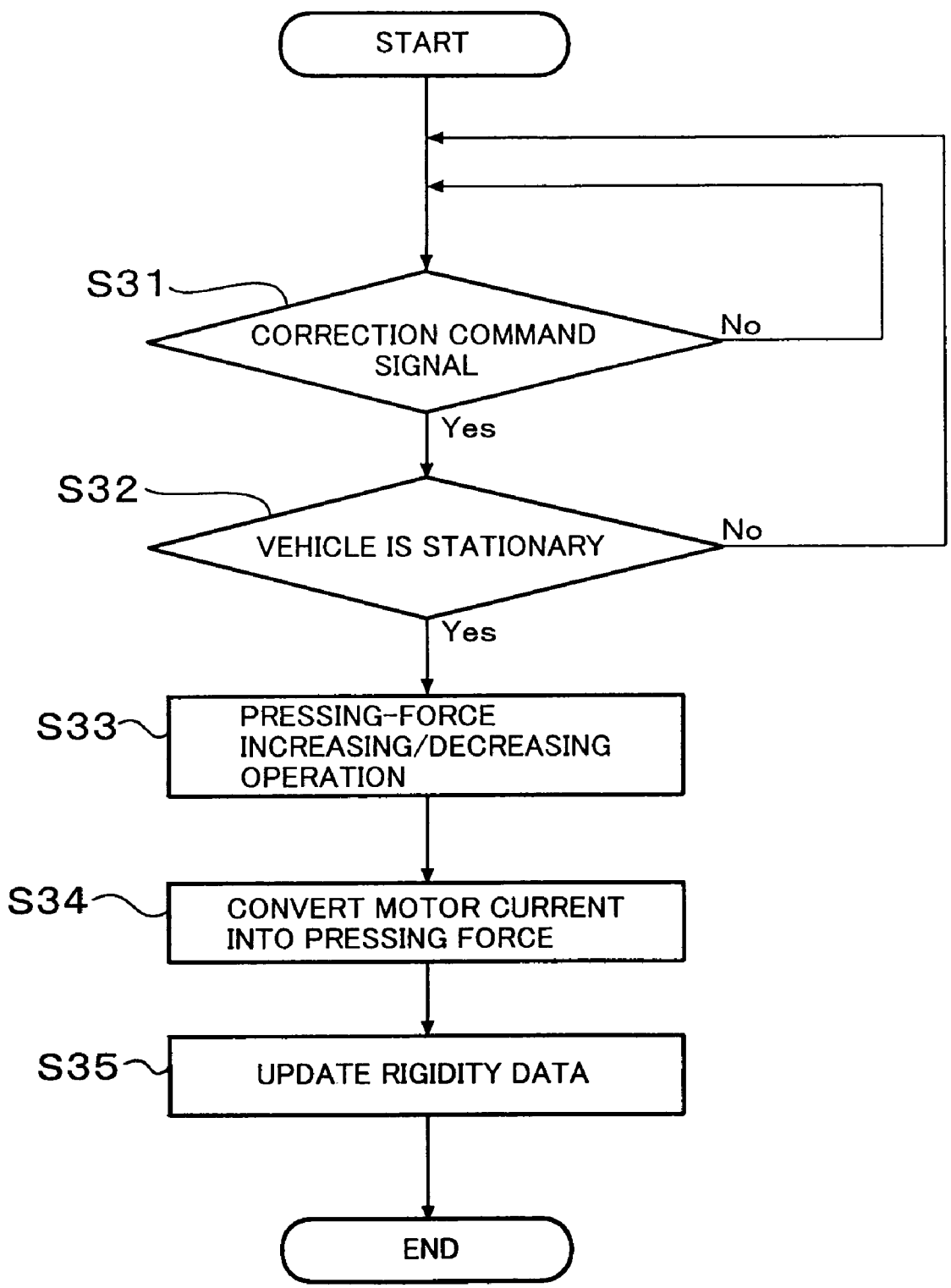
FIG. 12 is a flowchart showing a process in which the rigidity graph correction is performed in response to a correction signal according to the embodiment.

FIG. 12 is a flowchart of a correction process performed when a correction command signal representing a command to perform the rigidity graph correction is received. The correction command signal is issued from the switch 35 (see FIG. 1) provided on the vehicle. The switch 35 functions as a switch for starting the operation of the brake actuators. The correction command signal is transmitted to the brake controllers 4 via the main controller 3. In the correction process performed in response to the correction command signal, first, the correction command signal is detected in Step 31. Then, it is determined whether or not the vehicle is stationary in Step 32. If it is confirmed that the vehicle is stationary in Step 32, a pressing-force increasing/decreasing operation is performed in Step 33. This operation is performed to obtain a motor current corresponding to the motor position, and the thus-obtained motor current is converted into the pressing force to obtain the rigidity graph data in Step 34. Then, the rigidity graph data stored in the memory of each brake controller is updated in Step 35.

Figure 13:
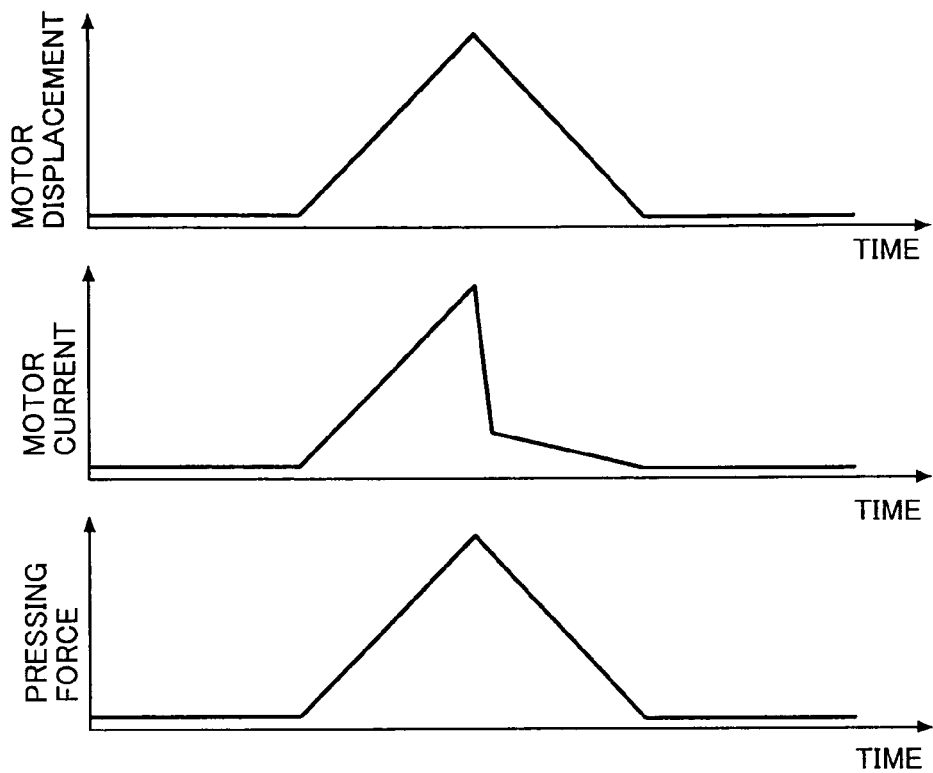
FIG. 13 is a diagram illustrating a pressing-force increasing/decreasing operation performed when the rigidity graph correction is performed in response to the correction signal according to the embodiment.

FIG. 13 is a schematic diagram illustrating the pressing-force increasing/decreasing operation performed in Step 33 shown in FIG. 12. When the motor displacement is increased and then reduced, the pressing force is increased and then reduced in a similar manner. However, although the motor current is increased along with the motor displacement when the motor displacement is increased, the motor current is not always reduced along with the motor displacement when the motor displacement is reduced. This is due to the nonlinearity of the actuator. Therefore, only the current data obtained when the motor displacement is increased is used for constructing the rigidity graph. The control of updating the rigidity data shown in FIG. 12 is performed while the vehicle is stationary. Therefore, it is effective to perform this control at the timing of legally required inspections of the vehicle. In such a case, the correction can be reliably performed at regular intervals, and accordingly the safety in driving the vehicle can be prevented from being endangered due to aging of the brake devices.

Basically, the processes of correcting and updating the rigidity data shown in FIGS. 12 and 13 are performed while the vehicle is stationary, and the rigidity data correction control shown in FIG. 5 is performed while the vehicle is moving. These processes may be performed individually or in combination as necessary while the vehicle is moving or stationary.

Figure 14:
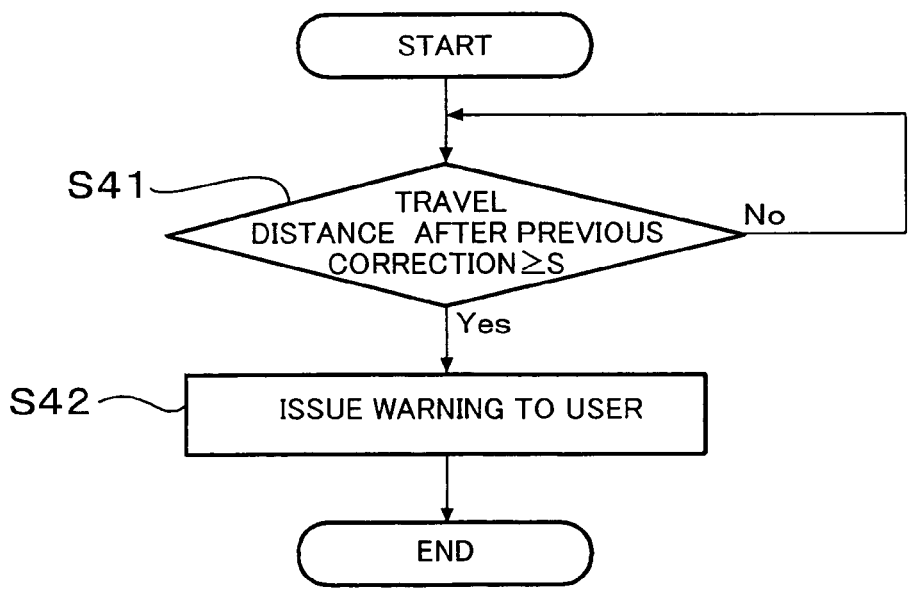
FIG. 14 is a flowchart showing a control for prompting a user to correct the rigidity graph in accordance with a predetermined travel distance.

FIG. 14 is a flowchart of a control for issuing a warning to prompt the vehicle user to perform the rigidity graph correction control depending on the travel distance of the vehicle. In this control, when the correction operation is completed, the travel distance at that time is recorded. In Step 41, the travel distance at the time when the correction was performed the last time and the current travel distance are compared with each other. If the difference between the travel distances is equal to or more than a predetermined value S, a warning is issued to the user in Step 42. Due to this control, the possibility that the rigidity graph correction will be reliably performed in accordance with the frequency of use of the brake devices is increased, and accordingly the safety in driving the vehicle is improved.

As described above, the present invention is mainly directed to solve the problem that the vehicle becomes unstable when the braking forces applied to the left and right wheels differ from each other due to variations and differences in graphs which each represent the relationship between the motor position and the pad-pressing force. According to the present invention, the memory data representing the relationship between the motor position and the pad-pressing force is updated using the state of the brake actuators obtained when the driving state of the vehicle is stabilized by operating the brake devices during braking. Accordingly, it is possible to apply the same pressing force to the left and right wheels irrespective of the variation in the current sensor value used for acquiring the above-mentioned relationship and the variation in the rigidity of each brake actuator due to aging thereof.

The brake control apparatus for the vehicle according to the embodiment of the present invention has the following structures to provide the functions or operations thereof. That is, the brake control apparatus for the vehicle that can individually control the braking forces applied to the wheels of the vehicle corrects the relationship between the piston position and the pad-pressing force recorded by a control-information recording device. The correction is performed using the piston position (or the motor position) of each brake device obtained after stabilizing the driving state of the vehicle by driving the brake devices on the basis of a physical value, such as the yaw angular velocity and the wheel speed, that shows the driving state of the vehicle and that is obtained by a sensor. According to this embodiment, the relationship between the motor position and the pad-pressing force can be corrected even when this relationship varies due to aging of the brake actuator and ambient temperature variations. As a result, the vehicle is prevented from becoming unstable due to a difference between the braking forces applied to the left and right wheels.

The relationship between the piston position (or the motor position) and the pad-pressing force that is stored in the control-information recording device may be corrected using the drive data of each brake device that is obtained by causing the brake device to perform a predetermined operation while the vehicle is stationary. In such a case, the drive data of each brake device that is not affected by the inertia of the components in the actuator can be obtained by causing the brake device to perform the predetermined operation while the vehicle is stationary. As a result, the relationship between the piston position and the pad-pressing force can be reliably corrected.

In addition, the brake control apparatus may include an external interface for receiving a signal for starting the operation of correcting the relationship between the piston position (or the motor position) and the pad-pressing force that is stored in the control-information recording device. When this signal is input, the relationship between the piston position and the pad-pressing force is corrected. In this case, the vehicle user or the maintenance person can start the operation of the brake device for the above-described correction after stopping the vehicle to ensure safety.

The operation for correcting the relationship between the piston position and the pad-pressing force may be periodically performed at the timing of legally required inspections of the vehicle. In such a case, even when the correction is not performed in response to the brake command while the vehicle is driven and aging of the actuators progresses, the correction can be reliably performed at regular intervals and the safety in driving the vehicle can be improved. In addition, the brake control apparatus may also include a detector for detecting the travel distance of the vehicle. When the travel distance detected by the detector reaches a predetermined distance, the vehicle user is warned that it is necessary to correct the relationship between the piston position and the pad-pressing force that is stored in the control-information recording device. In such a case, the correction operation can be performed at a suitable timing based on the travel distance and the safety in driving the vehicle can be improved.

In the electric brake actuator for moving the piston by driving a motor, the motor position may be used as the drive data of the brake device instead of the piston position. In such a case, an influence of differences between the motor position and the piston position due to backlash or the like in the actuator can be eliminated.

What is claimed is:

1. A brake control apparatus for a vehicle having brakes for applying braking forces to wheels using respective brake friction members, the brake control apparatus comprising:
   brake controllers for individually controlling displacements of the brake friction members;
   storage units for storing drive data required for controlling the displacements;
   a vehicle-driving-state detector for detecting a physical value that indicates a driving state of the vehicle; and
   a vehicle controller for controlling the driving state of the vehicle using the brake controllers for each wheel on the basis of the detected physical value,
   wherein the vehicle controller acquires control data as a result of controlling the driving state of the vehicle, in which driving state a difference in braking force occurs between left and right vehicle wheels, using the brakes means, corrects the drive data stored in one or more of the storing units using the acquired control data, and updates the drive data stored in one or more of the storing units.

2. The brake control apparatus according to claim 1, wherein the vehicle controller acquires the control data on the basis of a pressing force applied to each wheel after vehicle-stabilizing control, the vehicle-stabilizing control being performed when a yaw angular velocity is equal to or more than a predetermined value during brake control performed in response to a brake command.

3. The brake control apparatus according to claim 2, wherein the correction of the drive data is performed when a predetermined time is elapsed after the start of the vehicle-stabilizing control, when a steering angle during braking performed by the brake means is less than a predetermined value, and when a variation width of the yaw angular velocity during the vehicle-stabilizing control is less than a predetermined value.

4. The brake control apparatus according to claim 2, wherein the vehicle-stabilizing control is performed so as to reduce or eliminate yawing of the vehicle.

5. The brake control apparatus according to claim 1, wherein the drive data is corrected and updated at the time when legally required inspections of the vehicle is performed.

6. The brake control apparatus according to claim 1, wherein the vehicle controller receives a travel distance of the vehicle from a travel-distance detector and issues a warning that the drive data is to be corrected and updated when the total travel distance reaches a predetermined value.

7. The brake control apparatus according to claim 1, wherein the drive data includes characteristic data representing the relationship between a motor position and a pressing force applied to a brake pad.

8. The brake control apparatus according to claim 1, wherein the brake means includes a motor and a piston for each wheel, the motor generating a driving force to move the piston, the movement of the piston causing the corresponding brake friction member to come into contact with a rotating member that rotates together with the wheel, and wherein the drive data is characteristic data representing the relationship between data of displacement of the piston and data of pressing force applied between the brake friction member and the rotating member.

* * * * *